United States Patent [19]

Akimoto et al.

[11] Patent Number: 4,986,860

[45] Date of Patent: Jan. 22, 1991

[54] METHOD FOR PRODUCING A LAMINATED MATERIAL

[75] Inventors: Hirofumi Akimoto; Sadayuki Takeyama; Toshimichi Hiki; Masayuki Kondo, all of Hamamatsu, Japan

[73] Assignee: Kyowa Leather Cloth Co., Ltd., Japan

[21] Appl. No.: 243,997

[22] Filed: Sep. 13, 1988

[30] Foreign Application Priority Data

Sep. 18, 1987 [JP] Japan ................................ 62-234125

[51] Int. Cl.$^5$ ................................................ B32B 5/18
[52] U.S. Cl. ................................. 156/78; 156/244.23; 156/307.7; 264/45.9; 428/319.7; 521/94
[58] Field of Search ................... 264/45.9; 156/244.23, 156/307.7, 78; 521/94; 428/319.7

[56] References Cited

U.S. PATENT DOCUMENTS

| 4,028,449 | 6/1977 | Kakitani et al. ................. 521/94 |
| 4,781,976 | 11/1988 | Fujita et al. ................. 428/319.7 |

FOREIGN PATENT DOCUMENTS

| 0019910 | 12/1980 | European Pat. Off. . |
| 53-5068 | 2/1978 | Japan . |
| 53-18665 | 2/1978 | Japan . |
| 55-155036 | 12/1980 | Japan . |
| 58-1729 | 1/1983 | Japan ................. 264/45.9 |
| 58-27818 | 6/1983 | Japan . |
| 59-123623 | 7/1984 | Japan . |
| 62-13788 | 4/1987 | Japan . |
| 63-193825 | 8/1988 | Japan . |
| 1210637 | 10/1970 | United Kingdom . |
| 1439952 | 6/1976 | United Kingdom . |
| 2139629 | 11/1984 | United Kingdom . |

OTHER PUBLICATIONS

Kobunshi, vol. 12, No. 136, p. 514, published Jun. 20, 1963.

Primary Examiner—John J. Gallagher
Attorney, Agent, or Firm—Oliff & Berridge

[57] ABSTRACT

A method for producing a laminated material including a lower layer of highly-expanded plasticized polyvinyl chloride with cross-linking and a surface layer of thermoplastic resin sheet laminated on an upper surface of said lower layer, said method including the steps of: heating and kneading raw materials for the lower layer in an extruder, the raw materials excluding a cross-linking agent and a blowing agent; adding the cross-linking agent and the blowing agent; heating and kneading the obtained material at or less than a reacting temperature of the cross-linking agent and a decomposition temperature of the blowing agent to obtain a sheet; heating the sheet to cross-link and expand the sheet to form the lower layer of cross-linked highly-expanded plasticized polyvinyl chloride; and laminating the surface layer of the thermoplastic resin on the upper surface of the lower layer. The polyvinyl chloride resin is (A) a polyvinyl chloride resin having reacting groups in its molecules, or (B) a mixture of a polyvinyl chloride resin having no reacting groups in its molecules and a thermoplastic resin having reacting groups in its molecules.

24 Claims, No Drawings

METHOD FOR PRODUCING A LAMINATED MATERIAL

BACKGROUND OF THE INVENTION

Field of the Invention

This invention relates to a method for producing a highly-expanded non-rigid foamed sheet with cross-linking having a highly homogeneous cell structure for an interior trim material particularly for vehicles, and to a method for producing a light-weight laminated material having soft touch and good cushioning as well as excellent moldability and high-frequency welding workability.

Conventionally, known interior trim materials for vehicles having cushioning properties include laminated materials composed of (1) a surface layer of plasticized polyvinyl chloride sheet and a lower foamed layer of expanded polyolefin resin such as polyethylene, polypropylene, etc., bonded to the surface layer; (2) a surface layer of plasticized polyvinyl chloride sheet and a lower foamed layer of expanded plasticized polyvinyl chloride without cross-linking, united with the surface layer, and (3) a surface layer of plasticized polyvinyl chloride sheet and a lower foamed layer of highly-expanded plasticized polyvinyl chloride with cross-linking laminated to the surface layer.

In regard to the above-described laminated material (1), it is necessary to cross-link foamed resin layers with electron rays, and then to expand them by heating, which results in a large amount of capital investment. Since this method requires complicated treating processes, it is inferior in productivity. In addition, said laminated material is also inferior in high-frequency welding workability because the lower foamed layer is composed of an expanded polyolefin sheet.

In regard to the above-described laminated material (2), the expanded sheet can be produced economically with general production facilities. However, only an extremely low-expanded sheet is obtained, because of its upper expansion coefficient limit of 3-4. Thus, this laminated material lacks, softness, light-weight, and cushioning. In addition, since the foamed layer of said laminated material is non-cross-linking, it is crushed when thermoforming so that molded interior trim material for vehicles can not be obtained.

In regard to the above-described laminated material (3), a soft, light and cushioning product can be obtained because of its highly-foamed layer, but the kneading and dispersing effect of the above-described resin component with a cross linking agent and a blowing agent is imperfect. The crosslinking reaction only proceeds partially, because of insufficiently controlled temperature and treating time during roll-mill kneading and sheeting by a calender, so that it is difficult to homogeneously cross-link and expand it. As a result thereof, an expanded product with homogeneous cross-linking structure and homogeneous cell structure is not obtained, deep drawing moldability in thermoforming is low, and an interior trim material with highly accurate and sharp contour can not be obtained.

In addition, since roll-mills are used for kneading and pelletizing and sheeting is carried out by means of a calender or an extruder, this process is inferior also in productivity.

SUMMARY OF THE INVENTION

The main object of the present invention is to provide a method for producing a laminated material whose foamed layer comprises a highly-expanded plasticized polyvinyl chloride sheet with cross-linking having homogeneous cross-linking structure and homogeneous cell structure.

The present invention relates to a method for producing a laminated material comprising a lower layer of cross-linked highly-expanded plasticized polyvinyl chloride and a surface layer of thermoplastic resin sheet laminated on an upper surface of said lower layer, wherein the polyvinyl chloride resin is (A) a polyvinyl chloride resin having reacting groups in its molecules, or (B) a mixture of a polyvinyl chloride resin having no reacting groups in its molecules and a thermoplastic resin having reacting groups in its molecules, said method comprising: sufficiently heating and kneading raw materials for the lower layer in an extruder, the raw materials excluding a cross-linking agent and a blowing agent; adding the cross-linking agent and the blowing agent; heating and kneading the obtained material at or less than a reacting temperature of the cross-linking agent and a decomposition temperature of the blowing agent to obtain a sheet; heating the sheet to cross-link and expand the sheet to form the lower layer of cross-linked highly-expanded plasticized polyvinyl chloride; and laminating the surface layer of the thermoplastic resin on the upper surface of the lower layer.

DESCRIPTION OF THE PREFERRED EMBODIMENTS

In the present invention, highly-expanded plasticized polyvinyl chloride with cross-linking for a lower layer (hereinafter referred to as "lower foamed sheet") is formed first, and then thermoplastic resin (hereinafter referred to as "surface layer") is laminated onto the upper surface thereof. The lower foamed sheet is formed first. Raw materials for said lower layer and other materials, except a cross-linking agent and a blowing agent (in other words, plasticizer, stabilizer, pigment etc.), are mixed, and the mixture thus obtained is put in an extruder directly or being pelletized. The mixture is sufficiently heated and kneaded, dispersing each mixing component homogeneously. Then the cross-linking agent and the blowing agent are added concurrently into the same extruder or a separate extruder, heated and kneaded, and dispersed homogeneously and sufficiently in said mixture. The mixture thus obtained is then sheeted with a T-die.

The reason why the cross-linking agent and the blowing agent are added later is as follows. The raw material mixed earlier is dispersed sufficiently and homogeneously with other components such as plasticizer, etc. Thereafter, the cross-linking agent and the blowing agent are added sequentially through another feed port of the same extruder or a separate extruder, or added simultaneously into an another extruder with a pre-pelletized mixture, and kneaded. The reacting groups of the resin and cross-linking agent undergo a homogeneous cross-linking reaction due to a closed and continuous kneading system, accurate kneading temperature, accurately controlled treatment, controlled time, and kneading effects which are characteristic of an extruder. Therefore, a very strictly controlled reaction can take place, thereby forming a highly-expanded product with excellent and homogeneous cell structure. The blowing agent is also dispersed sufficiently to obtain an expanded product with homogeneous cell structure. In the conventional method wherein a cross-linking agent and a blowing agent are kneaded and treated concurrently with other components, such accurate dispersing and kneading, cross-linking structure, controlled reaction, and accurately controlled kneading temperature and time are impossible, and therefore, an expanded product with good cell structure, cross-linking structure, compressive hardness, etc., pursued according to the present invention can never be obtained.

The resin used for the lower layer foamed sheet according to the invention may be either of (A) a polyvinyl chloride resin having reacting groups in its molecules, or (B) a mixture of a polyvinyl chloride resin having no reacting groups in its molecules and a thermoplastic resin having reacting groups in its molecules.

The polyvinyl chloride resin having reacting groups in its molecules used in case (A) is a copolymer of a vinyl chloride monomer and a monomer containing a hydroxyl or a carboxyl group. Copolymers of a vinyl chloride monomer and a monomer selected from the group consisting of 2-hydroxy ethyl acrylate, 2-hydroxy ethyl methacrylate, 2-hydroxy propyl acrylate, acrylic acid, methacrylic acid, etc., are preferable.

The cross-linking agent used in the present invention is an isocyanate compound or an amine compound.

1-10 parts by weight of the cross-linking agent and 5-30 parts by weight of a blowing agent such as azodicarbonamide, etc., which is generally used for polyvinyl chloride resin, are added to 100 parts by weight of said polyvinyl chloride having reacting groups in its molecules.

In case of less than 1 part by weight of the cross-linking agent, too little cross-linking occurs, resulting in too low of a melting viscosity of heated resin compositions in an expansion process. Thus, too much decomposition gas of blowing agent escapes into atmospheric air, only a low expansion coefficient is accomplished, and a desirable highly-expanded product can not be obtained. With more than 10 parts by weight of said cross-linking agent, much cross-linking occurs, resulting in a melting viscosity which is too high. Thus, the growth of cells is prohibited, and a desirable highly-expanded product can also not be obtained. With less than 5 parts by weight of said blowing agent, an expanded product with desirable expansion coefficient can not be obtained. With more than 30 parts by weight of said blowing agent, an expanded product with desirable homogeneous cell structure can not be obtained. If the cross-linking agent and the blowing agent are added in a quantity out of the range specified above, a lower layer foamed sheet with desirable compressive hardness in the present invention can not be obtained, and the obtained lower layer foamed sheet has disadvantages in softness, light-weight and cushioning, and is also inferior in moldability as an interior trim material.

The polyvinyl chloride resin having no reacting group in (B) mixture is a polyvinyl chloride homopolymer, a copolymer of vinyl chloride and vinyl acetate, a copolymer of vinyl chloride and olefin such as ethylene, propylene, etc., a copolymer of vinyl chloride and styrene, or a copolymer of vinyl chloride and vinyl ether. The thermoplastic resin having reacting groups in its molecules mixed with said polyvinyl chloride resin, contains a hydroxyl group, a carboxyl group, or an amino group. The thermoplastic resin is preferably a polyvinyl chloride resin, or an acrylic rubber containing, for example, a hydroxyl group or a carboxyl group, and is most preferably an alkyl acrylate ester. The polyvinyl chloride resin having no reacting groups in its molecules and the thermoplastic resin having reacting groups in its molecules are preferably mixed in the proportion of 20-80 parts by weight to 80-20 parts by weight. If the mixing thereof is performed out of the specified proportion, a good cross-linked highly-expanded product can not be obtained.

1-10 parts by weight of said cross-linking agent are mixed with 100 parts by weight of said thermoplastic resin having reacting groups in its molecules in said (B) mixture. 5-30 parts by weight of said blowing agent are mixed with 100 parts by weight of said (B) mixture of the polyvinyl chloride having no reacting groups in its molecules and the thermoplastic resin having reacting groups in its molecules.

When the lower foamed sheet is formed, stabilizer for expanding of polyvinyl chloride, plasticizer and pigment are mixed in addition to the above cross-linking agent and blowing agent. The plasticizer used in the present invention is, for example, trimellitic acid ester. 30-60 parts by weight of plasticizer is mixed with 100 parts by weight of the total polyvinyl chloride resin having reacting groups and no reacting groups in its molecules. The quantity of the plasticizer affects the compressive hardness of the lower foamed sheet.

The above described components for the lower layer foamed sheet are mixed, as described above, in an extruder, and said components are kneaded sufficiently homogeneously at or less than a reacting temperature of the cross-linking agent and at or less than a decomposition temperature of the blowing agent to form extruded unfoamed sheet by means of a T-die. The sheet is then heated at or above the reacting temperature of the cross-linking agent and at or above the decomposition temperature of the blowing agent, using any of a vertical type foam oven, a floating chamber type foam oven (a lateral wire netting type foam oven) or a salt bath, and said sheet is thereby cross-linked and expanded so that a lower layer foamed sheet with a high expansion coefficient is obtained. It is essential to form a lower layer foamed sheet with an expansion coefficient of 5-30 and a thickness of 0.5-8 mm. As described above, a lower layer foamed sheet in said expansion coefficient range and said thickness range is accomplished by choosing a cross-linking agent, a blowing agent and the plasticizer as well as their quantities. When a lower layer foamed sheet is formed outside of said ranges, it has the following disadvantages: (1) it is inferior in good cushioning due to light-weight and softness: (2) it is inferior in deep drawing moldability at vacuum forming or air-pressure forming: and (3) its appearance quality as an interior trim material is low because its surface has defects such as craters.

It is essential that said lower layer foamed sheet has a compressive hardness of 0.05-1.0 kg/cm$^2$. As described above, the lower layer foamed sheet in said compressive hardness range is accomplished by choosing a cross-linking agent, a blowing agent and a plasticizer as well as their quantities. If said compressive hardness is less than 0.05 kg/cm$^2$, the obtained lower foamed sheet is too soft, lacks in restoring force after removing the compressive loading, and is inferior in cushioning as an interior trim material as well as in moldability at thermoforming. If said compressive hardness is above 1.0 kg/cm$^2$, the above-described problems are resolved, but the obtained lower layer foamed sheet is too hard to accomplish softness.

A surface layer comprising a thermoplastic resin is formed on said lower layer foamed sheet. The thermoplastic resin sheet used for said surface layer is a resin selected from the group consisting of polyvinyl chloride, copolymer of vinyl chloride and vinylacetate, polyurethane, copolymer of vinyl chloride and polyurethane, copolymer of vinyl chloride and olefin such as ethylene, propylene and a mixture of polyvinyl chloride and AS resin, AAS resin, ABS resin nitrile rubber, acrylic rubber and/or EVA resin etc. These are used as colored sheet. AS resin, AAS resin, ABS resin, nitrile rubber, acrylic rubber and/or EVA resin, etc., act as a modifying agent of polyvinyl chloride.

A plasticizer, etc., is further added and mixed to the raw material for the surface layer and then from the mixture the sheet of the surface layer is formed by a calender or an extruder. The plasticizer used in the present invention is, for example, trimellitic acid ester, etc. The modifying agent used in the present invention is, for example, ABS resin, AS resin, AAS resin, etc.

It is essential that said surface layer has a thickness of 0.2–1.5 mm and a Shore-A-hardness of 40–80. When the thickness of said surface layer is less than 0.2 mm and the surface hardness thereof is less than 40, the obtained laminated material is inferior in scratch resistance, abrasion resistance and moldability. When the thickness of said surface layer is above 1.5 mm and the surface hardness thereof is above 80, the obtained laminated material is too heavy and too hard to realize light-weight and softness, and a sharp contour can not be obtained at thermoforming. The hardness of the surface layer is controlled by choosing the material for the surface layer and the plasticizer as well as their quantities. 30–150 parts by weight of the plasticizer and 10–100 parts by weight of the modifying agent are added and mixed to 100 parts by weight of the polyvinyl chloride having reacting groups so as to obtain the surface layer having a Shore-A-hardness of 40–80.

As described above, the thermoplastic resin sheet is formed by a calender or an extruder, on which drawn patterns are applied or printed patterns to form a surface layer. Then, said surface layer is laminated on the upper surface of said lower layer foamed sheet using a heat laminating method or an adhesive bonding method. Alternatively, a drawn pattern-detachable paper may be coated to obtain a patterned sheet, and a laminated material may be formed by either of said bonding methods. Said drawn patterns or printed patterns may be applied after said laminated material has been formed.

The laminated material according to the present invention is cut to a certain size to obtain products. These products are formed in various shapes corresponding to different interior trim locations in each vehicle using various molding methods such as vacuum forming, air-pressure forming, or press molding method etc.

EXAMPLES

In the following examples, the present invention is described in more detail.

EXAMPLE 1

Raw materials for the lower layer foamed sheet were used as indicated in the following Table 1. Said raw materials were mixed in an extruder having a T-die except azodicarbonamide (blowing agent) and blocked isocyanate (cross-linking agent). Kneading was performed at a temperature of 160° C. for about 2 minutes to disperse each of said components sufficiently homogeneously. Then said blowing agent and cross-linking agent were added sequentially through another feed port of the same extruder, and mixed and kneaded with said homogeneously dispersed components at a temperature of 150° C. for about 3 minutes to disperse all the components completely homogeneously. Thereafter, colored sheet having a thickness of about 1.2 mm was formed at a processing speed of about 4 m/min. Using a vertical type foam oven, said sheet was heated at a temperature of 240° C. for about 1 minute to cross-link and expand the sheet, thereby obtaining a lower layer foamed sheet having an expansion coefficient of about 15, a sheet thickness of about 3 mm and a compressive hardness of about 0.2 kg/cm$^2$. The obtained sheet had a very homogeneous cell structure because said blowing agent and cross-linking agent were dispersed sufficiently homogeneously in said components.

From the raw materials for the surface layer components described in Table 1, colored sheet having a thickness of 0.45 mm and a surface hardness of 70 was formed by a calender. On said colored sheet, deep drawn leather patterns were applied with a conventional embossing machine.

Using a reactive two-package polyurethane adhesive, said colored sheet was bonded to said lower layer foamed sheet, thereby forming a laminated material. The laminated material was cut to a certain size with a cutter to obtain a product. By molding the obtained product with a vacuum forming machine, an excellent laminated material for vehicle interior trim material was obtained which was superior in light-weight, softness and cushioning, was sound- and heat-insulating, was superior in moldability and in form retention after molding, and also had both sharp formability and excellent high-frequency welding workability corresponding to deep drawing and complicated contours.

TABLE 1

| | |
|---|---|
| (1) Raw materials for lower layer foamed sheet | |
| Copolymer of vinyl chloride and hydroxy acrylate | 100 parts by weight |
| Trimellitic acid ester (plasticizer) | 50 parts by weight |
| Ba-Zn stabilizer for expanding of polyvinyl chloride | 3 parts by weight |
| Pigment | 2 parts by weight |
| Azodicarbonamide (blowing agent) | 12 parts by weight |
| Blocked isocyanate (cross-linking agent) | 6 parts by weight |
| (2) Raw materials for surface layer | |
| Polyvinyl chloride resin (P = 1300) | 100 parts by weight |
| ABS resin | 50 parts by weight |
| Nitrile rubber | 15 parts by weight |
| Trimellitic acid ester (plasticizer) | 60 parts by weight |
| Ba-Ca-Zn stabilizer | 3 parts by weight |
| Pigment | 2 parts by weight |
| Filler | 20 parts by weight |

EXAMPLE 2

Raw materials for lower layer foamed sheet in the following Table 2 were used. Said raw materials except a cross-linking agent and a blowing agent were mixed in an extruder having a strand-type die. Kneading and pelletizing was performed at a temperature 170° C. for 90 seconds to disperse each of said components sufficiently homogeneously. Then, said blowing agent and cross-linking agent were added into an another extruder having a T-die, and mixed and kneaded with said homogeneously dispersed components (pre-pelletized mixture) completely homogeneously at a temperature of 150° C. for about 120 seconds. Thereafter colored sheet having a thickness of about 0.8 mm was formed at a processing speed of about 6 m/min. from the mixed and kneaded components. Using a vertical type foam oven, said sheet was then heated at a temperature of 220° C. for about 1 minute to cross-link and expand the sheet, thereby obtaining a lower layer foamed sheet having an expansion coefficient of about 8, a sheet thickness of about 1.5 mm and a compressive hardness of about 0.5 kg/cm$^2$.

From the raw materials for the surface layer described in Table 2, colored sheet having a thickness of 0.3 mm and a surface hardness of 55 was formed with an another extruder. Using an emboss roll in which leather patterns are applied on one of the laminating rolls, said lower layer foamed sheet was extruded and laminated, and deep drawn leather patterns were applied to the upper surface of said colored sheet concurrently to obtain a laminated material. Said laminated material was cut to a certain size with a cutter to obtain products. By molding the obtained products with a vacuum forming machine, an excellent laminated material for vehicle interior trim material which was superior in light-weight, softness and cushioning, was sound- and heat-insulating, was superior in moldability and in form retention after molding, and also had both sharp formability and excellent high-frequency welding workability corresponding to deep drawing and complicated contours.

TABLE 2

| (1) Raw materials for lower layer foamed sheet | |
|---|---|
| Polyvinyl chloride resin ($\overline{P}$ = 1100) | 50 parts by weight |
| Copolymer of vinyl chloride and hydroxypropylacrylate | 50 parts by weight |
| Trimellitic acid ester (plasticizer) | 40 parts by weight |
| Ba-Zn stabilizer for expanding of polyvinyl chloride | 3 parts by weight |
| Pigment | 2 parts by weight |
| Azodicarbonamide (blowing agent) | 6 parts by weight |
| Blocked isocyanate (cross-linking agent) | 3 parts by weight |
| (2) Raw materials for surface layer | |
| Polyvinyl chloride resin ($\overline{P}$ = 1450) | 100 parts by weight |
| EVA resin | 20 parts by weight |
| Trimellitic acid ester (plasticizer) | 70 parts by weight |
| Ba-Ca-Zn stabilizer | 2 parts by weight |
| Pigment | 2 parts by weight |
| Filler | 10 parts by weight |

The present invention relates to a method for producing a laminated material comprising a lower layer of cross-linked highly-expanded plasticized polyvinyl chloride and a surface layer of thermoplastic resin sheet laminated on the upper surface of said lower layer. A raw material used for the lower layer foamed sheet is either of (A) a polyvinyl chloride resin having reacting groups in its molecules, or (B) a mixture of a polyvinyl chloride resin having no reacting groups in its molecules and a thermoplastic resin having reacting groups in its molecules. The raw materials are previously heated and kneaded in an extruder. Then a cross-linking agent which reacts with said reacting groups of said raw materials and a blowing agent are added and kneaded in the same extruder or in an another extruder, thereby controlling the kneading temperature and treating temperature accurately. Therefore, not only a homogeneous cross-linking reaction is accomplished, but also a cross-linked highly-expanded product with good and homogeneous cell structure can be obtained. As a result thereof, an excellent product of interior trim material for vehicles can be obtained which product is superior in light-weight, softness and cushioning, has a very high surface hardness, is superior in moldability and in form retention after molding, and also has excellent high-frequency welding workability.

The present invention, wherein lower layer foamed sheet can be formed using only the same extruder or an another extruder, also has an advantage that the productivity can be improved due to easy and continuous production.

What is claimed is:

1. A method for producing a laminated material comprising a lower layer and a surface layer of thermoplastic resin sheet laminated on an upper surface of said lower layer,
   wherein said lower layer is mainly comprised of highly-expanded plasticized polyvinyl chloride with cross-linking, said lower layer comprising (A) a polyvinyl chloride resin having reacting groups, or (B) a mixture of a polyvinyl chloride resin having no reacting groups and a thermoplastic resin having reacting groups,
   said method comprising:
   heating and kneading raw materials for the lower layer in an extruder, said raw materials excluding a cross-linking agent and a blowing agent;
   adding the cross-linking agent and the blowing agent;
   heating and kneading the obtained material at a temperature lower than a reacting temperature of the cross-linking agent and a decomposition temperature of the blowing agent to obtain a sheet;
   heating the sheet without application of electron rays to cross-link and expand the sheet to form the lower layer mainly comprising cross-linked highly-expanded plasticized polyvinyl chloride; and
   laminating the surface layer of the thermoplastic resin on the upper surface of the lower layer.

2. The method according to claim 1, wherein said (A) polyvinyl chloride resin having reacting groups is a copolymer of a vinyl chloride monomer and a monomer containing hydroxyl or carboxyl groups.

3. The method according to claim 2, wherein said (A) polyvinyl chloride resin having reacting groups is a copolymer of a vinyl chloride monomer and a monomer selected from the group consisting of 2-hydroxy ethyl acrylate, 2-hydroxy ethyl methacrylate, 2-hydroxy propyl acrylate, acrylic acid and methacrylic acid.

4. The method according to claim 2, wherein said (A) polyvinyl chloride resin having reacting groups is a copolymer of vinyl chloride and hydroxy alkyl acrylate.

5. The method according to claim 1, wherein the polyvinyl chloride resin having no reacting groups in said (B) mixture is a vinyl chloride homopolymer, a copolymer of vinyl chloride and vinyl acetate, a copolymer of vinyl chloride and olefin, a copolymer of vinyl chloride and styrene, or a copolymer of vinyl chloride and vinyl ether.

6. The method according to claim 1, wherein the thermoplastic resin having reacting groups contained in said (B) mixture has a hydroxyl group, a carboxyl group or an amino group.

7. The method according to claim 5, wherein the thermoplastic resin having reacting groups contained in said (B) mixture is a polyvinyl chloride having a hydroxyl group or a carboxyl group, or an acrylic rubber.

8. The method according to claim 6, wherein the thermoplastic resin having reacting groups contained in said (B) mixture is an alkyl acrylate ester resin.

9. The method according to claim 6, wherein the thermoplastic resin having reacting groups contained in said (B) mixture is a copolymer of vinyl chloride and hydroxy propyl acrylate.

10. The method according to claim 1, wherein said cross-linking agent is an isocyanate compound or an amine compound.

11. The method according to claim 10, wherein said blowing agent is an azodicarbonamide.

12. The method according to claim 11, wherein 1–10 parts by weight of said cross-linking agent and 5–30 parts by weight of said blowing agent are mixed to 100 parts by weight of said (A) polyvinyl chloride having reacting groups.

13. The method according to claim 1, wherein 1–10 parts by weight of said cross-linking agent are mixed with 100 parts by weight of said thermoplastic resin having reacting groups in said (B) mixture, and 5–30 parts by weight of said blowing agent are mixed with 100 parts by weight of said (B) mixture of the polyvinyl chloride having no reacting groups and the thermoplastic resin having reacting groups.

14. The method according to claim 12, wherein said lower layer has an expansion coefficient of 5–30, a thickness of 0.5–8 mm and a compressive hardness of 0.05–1.0 kg/cm$^2$.

15. The method according to claim 5, wherein said polyvinyl chloride resin having no reacting groups and said thermoplastic resin having reacting groups are mixed in a proportion of 20–80 parts by weight to 80–20 parts by weight.

16. The method to according claim 1, wherein a stabilizer for expanding polyvinyl chloride, a plasticizer and a pigment are further mixed to form said lower layer.

17. The method according to claim 16, wherein said plasticizer is trimellitic acid ester.

18. The method according to claim 17, wherein 30–60 parts by weight of said plasticizer are mixed with 100 parts by weight of polyvinyl chloride having reacting groups.

19. The method according to claim 1, wherein said surface layer is made of a resin selected from the group consisting of polyvinyl chloride, copolymer of vinyl chloride and vinylacetate, polyurethane, copolymer of vinyl chloride and polyurethane, copolymer of vinyl chloride and olefin, and a mixture of polyvinyl chloride and AS resin, AAS resin, ABS resin, nitrile rubber, acrylic rubber and/or EVA resin.

20. The method according to claim 19, wherein 10–100 parts by weight of AS resin, AAS resin, ABS resin, nitrile rubber, acrylic rubber and/or EVA resin are mixed with 100 parts by weight of polyvinyl chloride.

21. The method according to claim 18, wherein a plasticizer, a stabilizer, a pigment and a filler are further mixed to form the surface layer.

22. The method according to claim 21, wherein 30–150 parts by weight of the plasticizer are mixed with 100 parts by weight of the polyvinyl chloride.

23. The method according to claim 22, wherein the surface layer has a thickness of 0.2–15 mm and a Shore-A-hardness of 40–80.

24. The method according to claim 22, wherein the plasticizer is trimellitic acid ester.

* * * * *